(12) United States Patent
Mehta et al.

(10) Patent No.: US 7,756,906 B2
(45) Date of Patent: Jul. 13, 2010

(54) SCHEMA-AWARE MID-TIER BINARY XML IMPLEMENTATION

(75) Inventors: Meghna Mehta, Santa Clara, CA (US); Yuhuan (Bill) Han, San Jose, CA (US); Jinyu Wang, Austin, TX (US); K. Karun, Sammamish, WA (US); Anguel Novoselsky, Foster City, CA (US); Tim Yu, Cupertino, CA (US); Kongyi Zhou, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 344 days.

(21) Appl. No.: 11/777,504

(22) Filed: Jul. 13, 2007

(65) Prior Publication Data

US 2008/0098002 A1   Apr. 24, 2008

Related U.S. Application Data

(60) Provisional application No. 60/853,004, filed on Oct. 18, 2006.

(51) Int. Cl.
*G06F 17/30* (2006.01)
(52) U.S. Cl. .................................. 707/803; 715/239
(58) Field of Classification Search .................. 715/223
See application file for complete search history.

(56) References Cited

U.S. PATENT DOCUMENTS

| 6,684,226 | B1 | 1/2004 | Bodilsen |
| 2002/0107880 | A1 | 8/2002 | Bacon |
| 2002/0188613 | A1 | 12/2002 | Chakraborty et al. |
| 2005/0278289 | A1* | 12/2005 | Gauweiler et al. ............. 707/1 |
| 2007/0239749 | A1* | 10/2007 | Farahbod .................... 707/101 |
| 2008/0040385 | A1 | 2/2008 | Barrall et al. |
| 2008/0065978 | A1* | 3/2008 | Francker et al. ............. 715/223 |

OTHER PUBLICATIONS

"XML Binary Characterization" downloaded Jul. 16, 2007 from the Internet <http://www.w3.org/TR/xbc-characterization/ 9 pages.

* cited by examiner

*Primary Examiner*—Apu M Mofiz
*Assistant Examiner*—Anteneh Girma
(74) *Attorney, Agent, or Firm*—Hickman Palermo Truong & Becker LLP; Daniel D. Ledesma

(57) ABSTRACT

Techniques for implementing a schema-aware mid-tier binary XML are provided. Token vocabularies are stored in a repository that is accessible to mid-tier applications from separate database systems. The token vocabularies are thus shared among the mid-tier applications of each database system. The repository may be part of a file system or database that is separate from any of the database systems, or the repository may be part of one of the database systems.

16 Claims, 2 Drawing Sheets

SCHEMA-AWARE MID-TIER BINARY XML IMPLEMENTATION

PRIORITY CLAIM

This application claims priority to U.S. Provisional Application 60/853,004, filed Oct. 18, 2006, entitled SCALABLE DOM IMPLEMENTATION AND OPTIMIZATION, the contents of which are incorporated by reference as if fully set forth herein.

FIELD OF THE INVENTION

This application is related to database systems, and in particular, to techniques for supporting schema-aware binary XML in a middle tier application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML

The number of businesses exchanging information electronically is proliferating. Businesses that exchange information have recognized the need for a common standard for representing data. Extensible Markup Language ("XML") is rapidly becoming that common standard.

XML describes and provides structure to a body of data, such as a file or data packet. The XML standard provides for tags that delimit sections of XML data referred to as XML elements. HTML is a form of XML.

An element may contain various types of data, including attributes and other elements. An element that is contained by another element is referred to as a descendant of that other element. By defining an element that contains attributes and descendant elements, the XML entity defines a hierarchical relationship between the element, its descendant elements, and its attributes. A set of elements that have such a hierarchical relationship is referred to herein as an XML tree.

Binary XML

Binary XML is one format in which XML data can be stored in a database. Binary XML is a compact binary representation of XML that was designed to reduce the size of XML documents. Although reference is made to a single "binary XML", XML data may be stored in multiple, proprietary binary formats.

XML documents are typically quite "verbose" in that they can contain a large number of repeated start tags, end tags, and whitespaces. Although the XML text format is designed for readability, it was not designed for efficient data storage or data transmission.

One of the ways in which data is compressed using binary XML is by representing strings ("tokens") with fixed values. In one implementation of binary XML, a mapping is established between tokens and replacement values, where the tokens are tag names, and the replacement values are numbers. Such mappings for a set of XML data, such as an XML document, are referred to herein as a "token vocabulary."

For example, consider an XML document PO1 that contains the following content:

```
<Purchase Order>
    <body>
        Important Data
    </body>
</Purchase Order>
```

PO1 includes the tokens "Purchase Order" and "body". To store PO1 in binary XML format, the token "Purchase Order" may be mapped to 1, and the token "body" may be mapped to 2. Typically, the replacement values consume much less space than the corresponding tokens. For example, the token "Purchase Order", which contains fourteen characters, may be assigned a binary replacement value that takes less space to store than a single text character.

Once a token vocabulary has been created, XML documents may be stored in binary XML based on the token vocabulary. For example, PO1 may be stored as <1><2>Important Data</2></1>. In typical implementations of binary XML, even the symbols (e.g. "<", ">", and "/") may be represented by binary replacement values.

Translating Between Binary XML and Text

When stored in binary XML, an XML document consumes much less space than is required by other formats of XML storage. However, the space savings is achieved at the cost of additional overhead required to convert textual XML to binary XML, and to convert binary XML to textual XML. For example, to be meaningful to an application that requests PO1, <1><2>Important Data</2></1> would have to be translated back into:

```
<Purchase Order>
    <body>
        Important Data
    </body>
</Purchase Order>
```

In order to reconstruct the text of an XML document that has been stored in binary format, the token vocabulary that was used to encode the XML document must be available. Token vocabularies, however, are only available to the database system in which the token vocabulary is stored. Therefore, only clients and middle-tier applications (e.g., database servers) of a database system have access to token vocabularies that are stored within that database system. If XML data is associated with a token vocabulary that is stored in a different database system, then a copy of the token vocabulary is not available.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
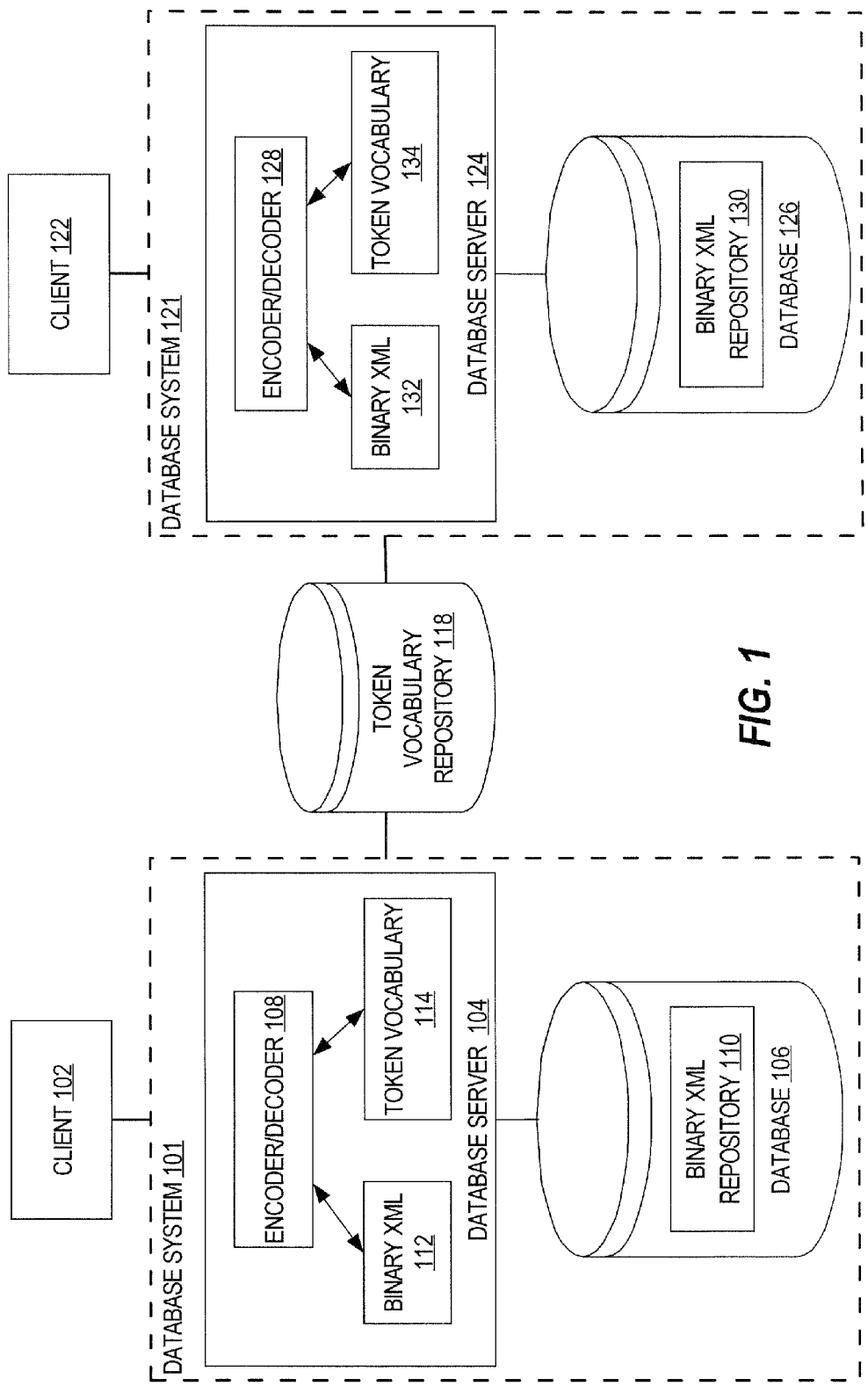
FIG. 1 is a block diagram that illustrates how token vocabularies may be shared among mid-tier applications from different database systems, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for implementing a schema-aware binary XML in a middle tier application are provided. Token vocabularies are stored in a repository that is accessible by middle-tier (mid-tier) applications from different database systems. For example, based on a request from a client to retrieve a text version of an XML document, a mid-tier application accesses the corresponding XML data from a database of the same database system. The mid-tier application also accesses the appropriate token vocabulary from the repository. The mid-tier application (or another application) decodes the XML data using the token vocabulary and provides the decoded XML document to the requesting client.

Schema-Aware Binary XML Mid-Tier Application

How a database system stores token vocabularies may hinge on whether a token vocabulary is for known-schema XML or for unknown-schema XML. XML data is "known-schema" XML if the database server knows the XML schema to which the XML data conforms. The database server may "know" the schema, for example, if the schema has been registered with the database server.

On the other hand, XML data is "unknown-schema" XML if the database server does not know the schema to which the XML data conforms. Thus, unknown-schema XML includes both (a) XML documents that do not conform to any schema, and (b) XML documents that conform to an XML schema, but the XML schema is not known to the database server.

In some database systems, the token vocabulary for known-schema binary XML is stored on a per-schema basis. Thus, since all documents that conform to a given schema will typically contain the same tag strings, the same token vocabulary is used to encode all of the documents that conform to the given schema.

According to an embodiment, the token vocabularies for known-schema binary XML are stored, in the database, as part of the definition of the schema. Schema definitions, in turn, are stored in a schema table.

In some database systems, the token vocabularies for all unknown-schema binary XML are stored in tables referred to herein as "token tables". In an embodiment, three token tables are used to store the token vocabularies for unknown-schema XML: a Qname token table, a namespace token table, and a path_id token table. The three token tables are collectively referred to as a "token table set". The Qname token table for an XML schema contains the Qname-to-replacement-value mappings used to encode the Qnames contained in unknown-schema XML. The namespace token table for an XML schema contains the namespace-to-replacement-value mappings used to encode the namespaces contained in unknown-schema XML. The path_id token table for an XML schema contains the path_id-to-replacement-value mappings used to encode the path_ids contained in unknown-schema XML.

A token vocabulary, for an XML document with a known schema, may be generated from the XML document itself or from XML schema to which the XML document conforms. Typically, a token vocabulary of a known schema is significantly smaller in size than a token vocabulary for an unknown schema.

EXAMPLE

FIG. 1 is a block diagram that illustrates an example of how token vocabularies may be shared among mid-tier applications from different database systems, according to an embodiment of the invention. The token vocabularies may be for known or unknown schemas. FIG. 1 illustrates two separate database systems 101 and 121. As used hereinafter, a "database system" comprises one or more database servers that are designated to managing one or more databases, wherein the one or more database servers are different than the one or more database servers of another database system.

In FIG. 1, database system 101 comprises a database server 104 and a database 106. Database 106 stores a binary XML repository 110 that comprises binary XML data. Database server 104 comprises an encoder/decoder 108. Similarly, database system 121 comprises a database server 124 and a database 126. Database 126 stores a binary XML repository 130 that comprises binary XML data. Database server 124 comprises an encoder/decoder 128. A token vocabulary repository 118 is communicatively coupled to database systems 101 and 121. Examples of the types of storage for token vocabulary repository 118 include, but are not limited to, a database and a file system. Clients 102 and 122 are communicatively coupled to database systems 101 and 121, respectively.

Clients 102 and 122 may be any program, other than database servers 104 and 124, in the chain of communication between a database application and database servers 104 and 124, respectively. Thus, in an embodiment, client 102 and/or 122 is the database application. In another embodiment, client 102 and/or 122 is a middle-tier layer situated between one or more database applications and database servers 104 and 124, respectively.

Referring again to FIG. 1, client 102 sends a request, to database system 101, for an XML document that is stored as binary XML in binary XML repository 110. In response to the request, database server 104 retrieves a binary XML data 112 from binary XML repository 110. Also, database server 106 uses the request or binary XML 112 to determine the token vocabulary or XML schema with which binary XML 112 is associated. Database system 101 sends an identifier (to token vocabulary repository 118) that identifies a token vocabulary 114 or the XML schema associated with token vocabulary 114. In response, token vocabulary repository 118 returns token vocabulary 114 to database system 101.

Encoder/decoder 108 decodes binary XML 112 into XML text using token vocabulary 114 retrieved from token vocabulary repository 118. After binary XML 112 is decoded, the XML text is sent to client 102.

FIG. 1 illustrates that encoder/decoders 108 and 128 are within database servers 104 and 124, respectively. However, in a related embodiment, at least one of encoder/decoders 108 and 128 are implemented within clients 102 and 122, respectively, and possibly other clients not shown. Such an arrangement is referred to as "client-side translation", whereas FIG. 1 illustrates a type of "server-side translation." There are multiple variations of client-side translation. For example, the encoder part of encoder/decoder 108 may be implemented within client 102 while the decoder part of encoder/decoder 108 may be implemented within database server 104.

Client-side translation provides significant benefits. For example, because the binary XML may be decoded at the client, the overhead of decoding the binary XML is avoided by the database server, thus improving database server scalability.

The receiving of XML data from client 102 may work in a similar manner. For example, client 102 sends XML text to database system 101, along with a request to store the XML text. Database server 104 may determine the token vocabulary or XML schema associated with the XML text based on an identifier included in the request or based on the XML text itself. Database server 104 sends a request, that includes an appropriate identifier, to retrieve the appropriate token vocabulary 114 from token vocabulary repository 118. Encoder/decoder 108 uses the retrieved token vocabulary 114 to encode the XML text into binary XML 112. Database server 104 then sends binary XML 112 to database 106 to be stored in binary XML repository 110.

FIG. 1 illustrates that token vocabulary repository 118 is not part of either database system 101 or database system 121. However, in a related embodiment, token vocabulary repository 118 may be stored in a database (such as database 126) or other repository associated with one of the database systems. In any embodiment, no matter where token vocabulary repository 118 is stored, middle-tier applications from multiple database systems have access to token vocabulary repository 118.

Registering an XML Schema

In an embodiment, an entity (e.g., database server 104) that includes at least one of encoder/decoder 108 verifies that an XML schema associated with XML text is registered with token vocabulary repository 118 before performing the encoding. Alternatively, that entity automatically registers the XML schema with repository at the time of encoding. The component that performs at least one of an encoding function or a decoding function is referred to hereinafter as a "binary XML processor". For example, database server 104 includes a binary XML processor. As another example, client 102 includes a binary XML processor that only decodes XML data.

Registering an XML schema with repository 118 includes providing the corresponding token vocabulary of the XML schema to repository 118. Alternatively, the act of registering an XML schema with repository 118 triggers repository 118 (or a process associated with repository 118) to generate a token vocabulary for that XML schema.

An attempt to register an XML schema that is already registered with repository 118 does not generate another copy of the corresponding token vocabulary.

A binary XML processor may not be thread safe. Therefore, according to an embodiment, each binary XML processor implements its own thread to ensure thread safety.

Local Token Vocabulary Manager and Cache

In an embodiment, a binary XML processor includes a local token vocabulary manager (TVM) and cache (TVC) that will cache token vocabularies in memory associated with the binary XML processor. A local TVM is responsible for providing the correct token vocabulary to the corresponding binary XML processor so that the binary XML processor only has to know about its core functionalities—encoding and/or decoding. Based on a request, a TVM may first determine whether a particular token vocabulary is in the TVC. If not, then the local TVM requests the token vocabulary from repository 118. After the TVM receives the token vocabulary from repository 118, TVM stores the token vocabulary in the TVC. Subsequently, the local TVM may first check the TVC to access the token vocabulary without requesting the token vocabulary from repository 118, which may taken considerably longer to retrieve.

In an embodiment, users of binary XML processors may plug in their own backend storage for storing token vocabularies by implementing a particular interface and plugging the backend storage into their respective binary XML processor. For example, users that employ Web Services and/or the Business Process Execution Language (BPEL) are interested in plugging in a file system for storage of metadata (such as token vocabularies) instead of a database. Such users may have to code up an implementation of the interface if one does not already exist for the particular backend storage. Binary XML processors use the interface to access token vocabularies stored in the persistent backend storage.

Hardware Overview

Figure 2:
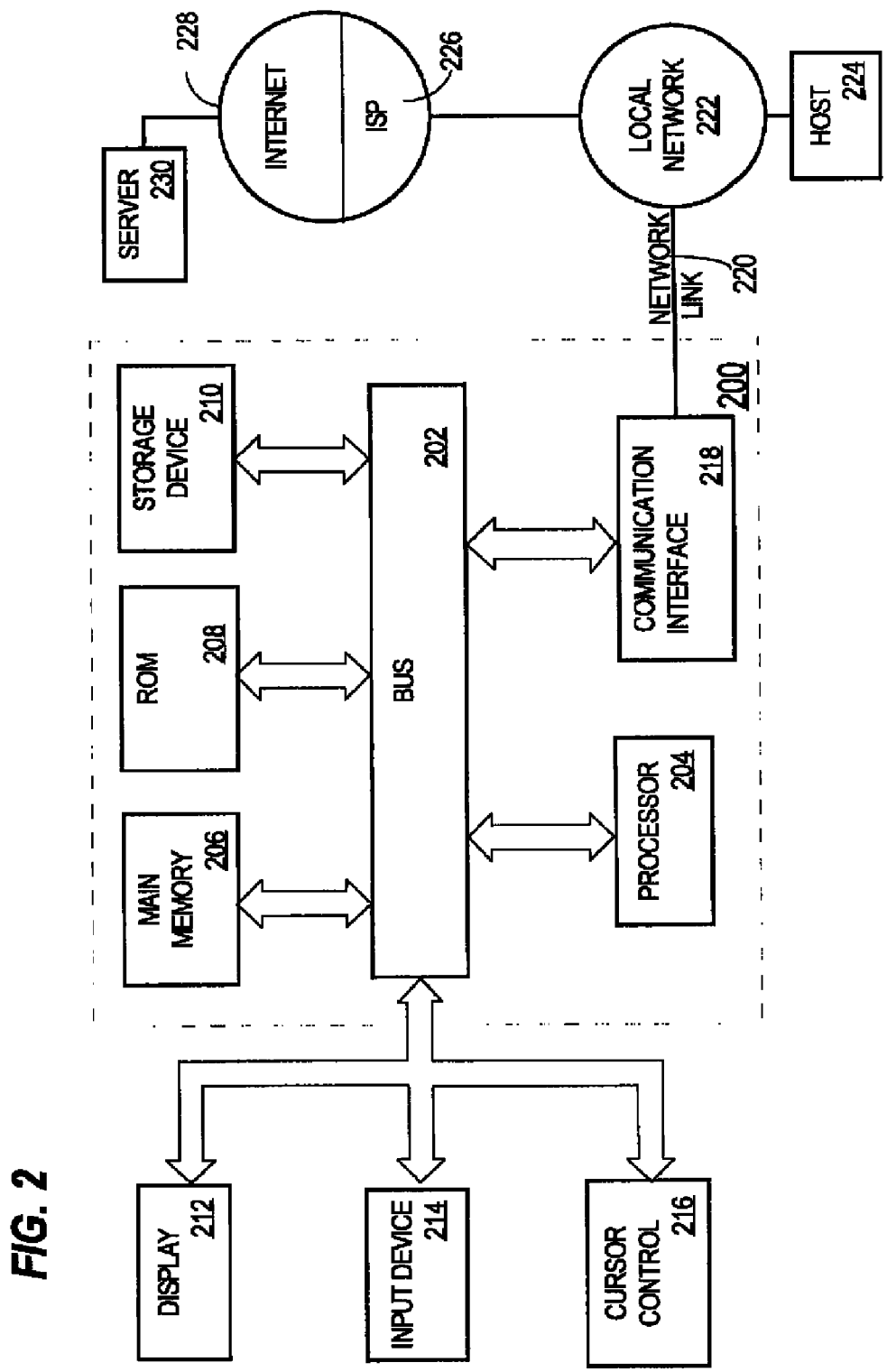
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to an embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for sharing one or more token vocabularies among a plurality of separate database systems, the method comprising:

storing the one or more token vocabularies in a repository, wherein:
  each token vocabulary of the one or more token vocabularies corresponds to an XML schema;
  each token vocabulary of the one or more token vocabularies defines a plurality of associations between XML elements and replacement values;
  the repository is accessible to the plurality of separate database systems; and
  each database system, of the plurality of separate database systems, comprises one or more database servers that are designated to managing one or more databases;

receiving, from a first database server of a first database system of the plurality of separate database systems, a first request for a token vocabulary;

in response to the first request, retrieving a first token vocabulary, of the one or more token vocabularies, from the repository;

sending the first token vocabulary to the first database server;

receiving, from a second database server of a second database system of the plurality of separate database systems, a second request for a token vocabulary, wherein the second database system is different than the first database system;

in response to the second request, retrieving a second token vocabulary, of the one or more token vocabularies, from the repository; and sending the second token vocabulary to the second database server.

2. The method of claim 1, wherein:
the first database server uses the first token vocabulary to either encode first XML data to conform to a binary format or to decode the first XML data from the binary format; and
the second database server uses the second token vocabulary to either encode second XML data to conform to the binary format or to decode the second XML data from the binary format.

3. The method of claim 1, wherein a database of the first database system includes the repository.

4. The method of claim 1, further comprising before receiving the first request, registering an XML schema, that corresponds to the first token vocabulary, with the repository.

5. The method of claim 1, wherein:
the first request includes a first identifier;
the first identifier is associated with the first token vocabulary that corresponds to a first XML schema; and
retrieving a first token vocabulary includes using the first identifier to identify the first token vocabulary.

6. A system for sharing one or more token vocabularies, the system comprising:
a first database system;
a second database system that is separate from the first database system; and
a repository that stores the one or more token vocabularies, wherein:
each token vocabulary of the one or more token vocabularies corresponds to an XML schema;
each token vocabulary of the one or more token vocabularies defines a plurality of associations between XML elements and replacement values; and
the repository is accessible to the first and second database systems;
wherein the first and second database systems are configured to:
request token vocabularies from the repository; and
perform at least one of encoding or decoding, based on one or more of the one or more token vocabularies, of XML data.

7. The system of claim 6, wherein a database server of the first database system registers an XML schema with the repository.

8. The system of claim 6, wherein:
the first database system includes a cache that stores a set of one or more token vocabularies that have been previously accessed from the repository; and
the first database system accesses, from the cache, a particular token vocabulary of the set of token vocabularies instead of requesting the particular token vocabulary from the repository.

9. The system of claim 6, wherein the system further comprises a third database system that is separate from the first and second database systems;
wherein:
a backend storage is plugged into the third database system;
the backend storage stores one or more second token vocabularies;
the third database system is configured to access the one or more second token vocabularies from the backend storage rather than the repository.

10. The method of claim 1, wherein:
the one or more token vocabularies is a plurality of token vocabularies;

each token vocabulary of the plurality of token vocabularies corresponds to an XML schema that is different than each other XML schema that corresponds to any other token vocabulary of the plurality of token vocabularies; and
the first token vocabulary is different than the second token vocabulary.

11. One or more storage media storing instructions for sharing one or more token vocabularies among a plurality of separate database systems, wherein the instructions, when executed by one or more processors, cause:
storing the one or more token vocabularies in a repository, wherein:
each token vocabulary of the one or more token vocabularies corresponds to an XML schema;
each token vocabulary of the one or more token vocabularies defines a plurality of associations between XML elements and replacement values;
the repository is accessible to the plurality of separate database systems; and
each database system, of the plurality of separate database systems, comprises one or more database servers that are designated to managing one or more databases;
receiving, from a first database server of a first database system of the plurality of separate database systems, a first request for a token vocabulary;
in response to the first request, retrieving a first token vocabulary, of the one or more token vocabularies, from the repository;
sending the first token vocabulary to the first database server;
receiving, from a second database server of a second database system of the plurality of separate database systems, a second request for a token vocabulary, wherein the second database system is different than the first database system;
in response to the second request, retrieving a second token vocabulary, of the one or more token vocabularies, from the repository; and
sending the second token vocabulary to the second database server.

12. The one or more storage media of claim 11, wherein:
the first database server uses the first token vocabulary to either encode first XML data to conform to a binary format or to decode the first XML data from the binary format; and
the second database server uses the second token vocabulary to either encode second XML data to conform to the binary format or to decode the second XML data from the binary format.

13. The one or more storage media of claim 11, wherein a database of the first database system includes the repository.

14. The one or more storage media of claim 11, wherein the instructions, when executed by the one or more processors, further cause before receiving the first request, registering an XML schema, that corresponds to the first token vocabulary, with the repository.

15. The one or more storage media of claim 11, wherein:
the first request includes a first identifier;
the first identifier is associated with the first token vocabulary that corresponds to a first XML schema; and
retrieving a first token vocabulary includes using the first identifier to identify the first token vocabulary.

16. The one or more storage media of claim 11, wherein:
the one or more token vocabularies is a plurality of token vocabularies;

each token vocabulary of the plurality of token vocabularies corresponds to an XML schema that is different than each other XML schema that corresponds to any other token vocabulary of the plurality of token vocabularies; and the first token vocabulary is different than the second token vocabulary.

* * * * *